United States Patent
Yeh et al.

(10) Patent No.: US 9,341,305 B2
(45) Date of Patent: May 17, 2016

(54) TENSILE SWITCHABLE SUPPORTING FRAME

(71) Applicant: SYNCMOLD ENTERPRISE CORP., New Taipei (TW)

(72) Inventors: Ching-Yi Yeh, New Taipei (TW); Juei-Hsien Wang, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 0 days.

(21) Appl. No.: 14/660,396

(22) Filed: Mar. 17, 2015

(65) Prior Publication Data

US 2016/0076693 A1   Mar. 17, 2016

(30) Foreign Application Priority Data

Sep. 16, 2014  (TW) .................................. 103216391

(51) Int. Cl.
*F16M 11/00* (2006.01)
*F16M 11/38* (2006.01)

(52) U.S. Cl.
CPC ......... *F16M 11/38* (2013.01); *F16M 2200/048* (2013.01); *F16M 2200/068* (2013.01)

(58) Field of Classification Search
CPC ............ F16M 11/38; F16M 2200/068; F16M 2200/048
USPC .............. 248/162.1, 127, 454, 917, 922, 371, 248/455, 457, 372.1, 919, 676, 133, 125.1, 248/920, 921
See application file for complete search history.

(56) References Cited

U.S. PATENT DOCUMENTS

| 6,532,628 | B2* | 3/2003 | Kim | G06F 1/1601 16/337 |
| 6,566,422 | B1* | 5/2003 | Yagi | C09J 7/00 523/440 |
| 7,770,856 | B2* | 8/2010 | Depay | F16M 11/10 248/278.1 |
| 7,967,273 | B2* | 6/2011 | Zhou | F16M 11/04 248/176.3 |
| 8,070,115 | B2* | 12/2011 | Wang | F16M 11/04 248/133 |
| 8,199,473 | B2* | 6/2012 | Zhou | F16M 11/10 248/917 |
| 8,201,792 | B2* | 6/2012 | Yuan | F16M 11/04 248/121 |
| 8,226,054 | B2* | 7/2012 | Chen | F16M 11/10 16/337 |
| 2003/0223188 | A1* | 12/2003 | Ha | F16M 11/04 361/679.06 |
| 2005/0029424 | A1* | 2/2005 | Liu | F16M 11/10 248/317 |
| 2006/0032998 | A1* | 2/2006 | Depay | F16M 11/10 248/291.1 |

FOREIGN PATENT DOCUMENTS

TW   M332337 U   5/2008
TW   I439130 B   5/2014

* cited by examiner

*Primary Examiner* — Mark Wendell
(74) *Attorney, Agent, or Firm* — Muncy, Geissler, Olds & Lowe, P.C.

(57) ABSTRACT

A tensile switchable supporting frame is provided. The supporting frame with an adjustable tensile structure includes at least two elastic modules, which are composed of a plurality of tension springs to achieve the objective of multi-stage adjustment. According to the weight of the loaded device, the user is capable of selecting the suitable elastic module to appropriately activate the amount of tension springs. The proper tension also provides the user with a better operative experience.

11 Claims, 10 Drawing Sheets

TENSILE SWITCHABLE SUPPORTING FRAME

This application claims priority to Taiwan Patent Application No. 103216391 filed on Sep. 16, 2014.

BACKGROUND OF THE INVENTION

1. Field of the Invention

The present invention relates to a tensile switchable supporting frame, and more particularly, to a supporting frame having a tensioning structure that allows for multi-stage adjustment of a loading force thereof.

2. Descriptions of the Related Art

Display products currently available are diversified with different specifications such as sizes and weights. Those supporting frames that support a display by means of fixed elastic force which cannot be adjusted, so that the application scope thereof is limited. In other words, when a display supported is replaced (e.g., because the user needs to replace it into a display of a greater size), the supporting frame might become unable to be continuously used. The user must purchase a new supporting frame that can match the new display.

Accordingly, an urgent need exists in the art to provide a supporting frame capable of switching between different tensile forces so as to be adapted to support electronic devices of different weights and to facilitate adjustment and operation by the user.

SUMMARY OF THE INVENTION

An objective of the present invention is to provide a tensile switchable supporting frame having a structural design that allows for multi-stage adjustment of a tensile force. The user can easily adjust the level of the tensile force and to select an appropriate loading capability to match the weight of different electronic devices or displays.

Another objective of the present invention is to provide a tensile switchable supporting frame in which elastic modules are composed of a plurality of tension springs respectively so that, according to a desired tensile force selected by the user, a corresponding amount of tension springs are activated and a better operational experience is provided to the user.

To achieve the aforesaid objectives, the present invention provides a tensile switchable supporting frame, which comprises a frame body, a pivoting shaft, a base and an adjustable tensile structure. The frame body is pivoted to the base via the pivoting shaft so that the frame body is capable of pivoting with respect to the base.

The adjustable tensile structure of the present invention comprises an accommodating base, a connecting string, a first elastic module, a second elastic module, a positioning plate and a first connecting element. The accommodating base is slidably disposed on the base. The two ends of the connecting string are engaged with the pivoting shaft and the accommodating base respectively. When the frame body pivots with respect to the base, the pivoting shaft pivots along with the frame body to drive the connecting string so as to drive the accommodating base. The first elastic module is disposed in the accommodating base, and comprises at least one first tension spring connected with the accommodating base and the base respectively. The second elastic module is disposed in the accommodating base, and comprises at least one second tension spring connected with the accommodating base and the first connecting element respectively. The positioning plate has a first groove, which comprises a first sliding region and a first limiting region that communicate with each other and extend in different directions. The first connecting element has a first column which penetrates through the first groove and selectively moves between the first sliding region and the first limiting region. In this way, the positioning plate is connected with the at least one second tension spring via the first connecting element.

When the positioning plate is located at a first position, the first column is located in the first sliding region, and when the frame body is folded towards the base, the connecting string is winded by the pivoting shaft to pull the accommodating base so that the first elastic module is tensioned. When the positioning plate is located at a second position, the first column is located in the first limiting region, and when the frame body is folded towards the base, the connecting string is winded by the pivoting shaft to pull the accommodating base so that both the first elastic module and the second elastic module are tensioned.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Referring firstly to FIGS. 1A-1D, a tensile switchable supporting frame 1000 of the present invention comprises a frame body 1, a pivoting shaft 2, a base 3 and an adjustable tensile structure 4. The base 3 is pivoted to the frame body 1 via the pivoting shaft 2 so that the frame body 1 is capable of pivoting with respect to the base 3. The adjustable tensile structure 4 is disposed on the base 3 and can be connected with the pivoting shaft 2 so that the pivoting shaft 2 can drive the adjustable tensile structure 4 to move, as shown in FIGS. 2A-2C. In order to clearly show the detailed operation mechanism of the adjustable tensile structure 4 when the tensile switchable supporting frame 1000 of the present invention is folded, the frame body 1 is omitted in FIG. 2C. The detailed structure of the adjustable tensile structure 4 and its operational relations with other elements will be detailed hereinbelow.

The adjustable tensile structure 4 comprises an accommodating base 41, three connecting strings 42, a first elastic module 43, a second elastic module 44, a third elastic module 45, a positioning plate 46, a first connecting element 47 and two second connecting elements 48.

The accommodating base 41 is slidably disposed on the base 3, and two ends of each of the connecting strings 42 are engaged with the pivoting shaft 2 and the accommodating base 41 respectively. When the frame body 1 is folded towards the base 3 so that the frame body 1 pivots with respect to the base 3, the pivoting shaft 2 pivots along with the frame body 1 to drive the connecting string 42 and the accommodating base 41 to move. Specifically, in the adjustable tensile structure 4 of this embodiment, the pivoting shaft 2 comprises three first engaging grooves 20, the accommodating base 41 comprises three second engaging grooves 410, and two ends of each of the connecting strings 42 are respectively provided with a protrusion 420a. The pair of the protrusions 420a of each connecting strings 42 are correspondingly engaged into a corresponding one of the first engaging grooves 20 and into a corresponding one of the second engaging grooves 410 respectively. It should be noted that each of the connecting strings 42 winds around a part of the surface of the pivoting shaft 2. Accordingly, when the pivoting shaft 2 pivots, each of the connecting strings 42 can be pulled to drive the accommodating base 41 to slide with respect to the base 3. Additionally, the numbers of the connecting strings 42, of the first engaging grooves 20 and of the second engaging grooves 410 can be correspondingly adjusted in coordination with each other as needed, and one set or more than four sets may be used.

Next, the structure of the first elastic module 43 and its corresponding connection relations with the accommodating base 41 and the base 3 will be described. The first elastic module 43 is disposed in the accommodating base 41, and comprises two first tension springs 430. The accommodating base 41 comprises a plurality of first protrusions 411, and the base 3 correspondingly comprises a plurality of second protrusions 35 so that two ends of each of the first tension springs 430 are connected with a corresponding one of the first protrusions 411 and a corresponding one of the second protrusions 35 respectively. Furthermore, in this embodiment, each of the first protrusions 411 and each of the second protrusions 35 are formed respectively by locking a screw onto the accommodating base 41 and the base 3 (see FIG. 1B). Accordingly, the height of each of the first protrusions 411 and each of the second protrusions 35 can be adjusted according to the thickness of each of the ends of each of the tension springs.

Then, the connection relations between the second elastic module 44, the accommodating base 41, the positioning plate 46 and the first connecting element 47 will be described in further details. The second elastic module 44 comprises two second tension springs 440; the first connecting element 47 comprises two first extension portions 471 and a first column 470; and the positioning plate 46 comprises a first groove 460. The first groove 460 has a first sliding region 460a and a first limiting region 460b that are intercommunicated with each other and extend in different directions. That is, the first sliding region 460a and the first limiting region 460b intersect with each other at an angle. In this embodiment, the first sliding region 460a is parallel to a tensioning direction D of each of the second tension springs 440; and the first sliding region 460a and the first limiting region 460b are perpendicular to each other, with the angle of 90°, to present a generally L-shaped form. The second elastic module 44 is disposed in the accommodating base 41, and two ends of each of the second tension springs 440 are connected with the corresponding first protrusion 411 of the accommodating base 41 and the corresponding first extension portion 471 respectively. The first column 470 penetrates through the first groove 460, and selectively moves between the first sliding region 460a and the first limiting region 460b.

The connection relations between the third elastic module 45, the accommodating base 41, the positioning plate 46 and the second connecting elements 48 will be described in further details. The third elastic module 45 comprises two third tension springs 450. Each of the second connecting elements 48 comprises a second extension portion 481 and a second column 480. The positioning plate 46 further comprises two second grooves 461. Each of the second grooves 461 has a second sliding region 461a and a second limiting region 461b that communicate with each other and extend in different directions. That is, the second sliding region 461a and the second limiting region 461b intersect with each other at an angle. In this embodiment, the second sliding region 461a and the second limiting region 461b are perpendicular to each other, with the angle of 90°, in the same manner as what described above in respect of the first sliding region 460a and the first limiting region 460b. The third elastic module 45 is disposed in the accommodating base 41, and two ends of each of the third elastic modules 45 are correspondingly connected with a corresponding one of the first protrusions 411 and a corresponding one of the second extension portions 481 so that the two ends of each of the third elastic modules 45 are connected with the accommodating base 41 and the second connecting element 48 respectively. Each of the second columns 480 penetrates through a corresponding one of the second grooves 461 and selectively moves between each of the second sliding regions 461a and a corresponding one of the second limiting regions 461b. Accordingly, the third elastic module 45 is connected with the accommodating base 41 and the second connecting element 48 respectively, and the positioning plate 46 is connected with each of the third tension springs 450 via the second connecting element 48.

Additionally, in other embodiments of the present invention, the numbers of the first tension springs 430, the first protrusions 411 and the second protrusions 35, the numbers of the second tension springs 440 and the first extension portions 471, and the numbers of the third tension springs 450, the second connecting elements 48 and the second grooves 461 can all be adjusted in coordination with each other as needed.

Figure 1A:
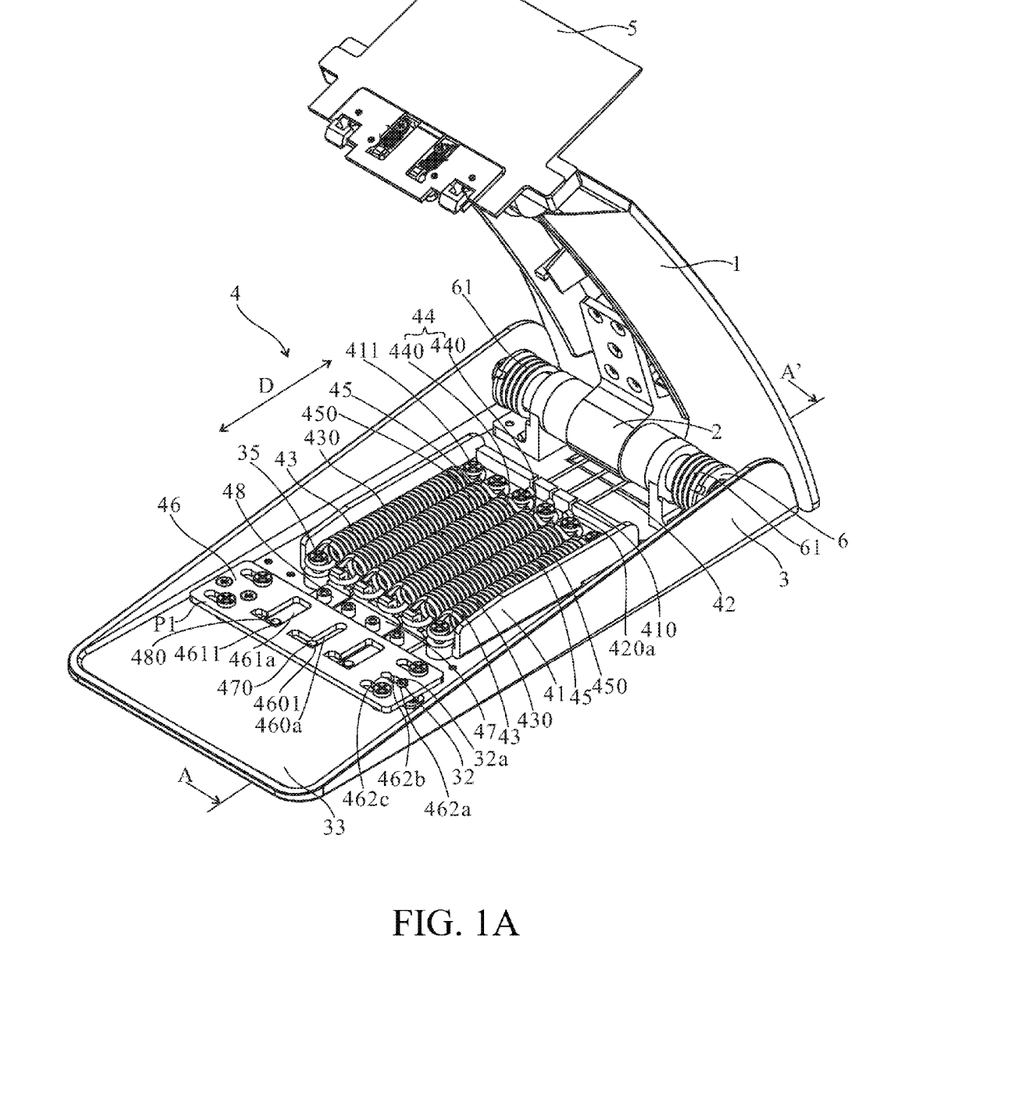
FIG. 1A is a schematic perspective view of a tensile switchable supporting frame according to the present invention.
Figure 1B:
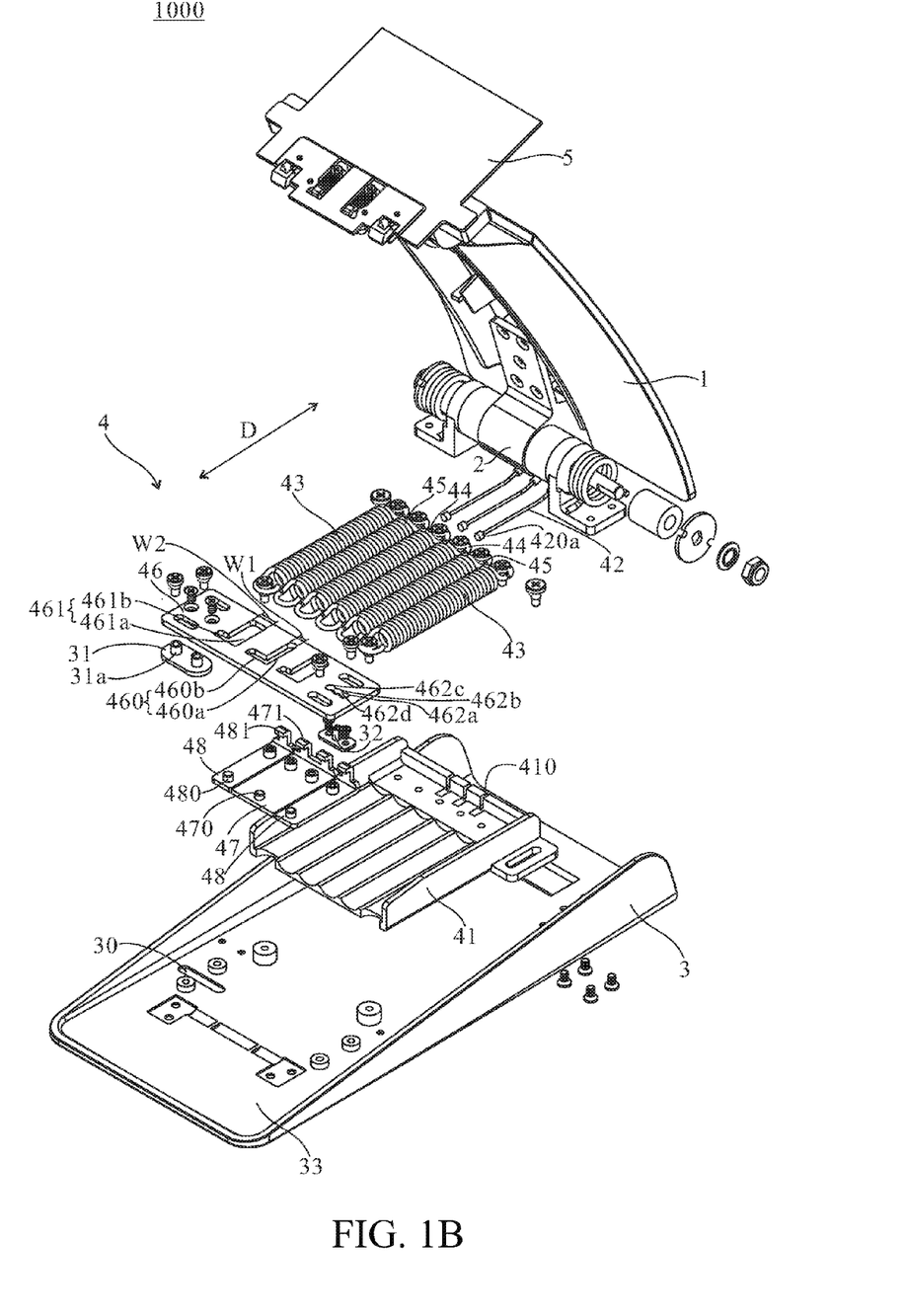
FIG. 1B is a schematic exploded perspective view of the tensile switchable supporting frame according to the present invention.
Figure 1C:
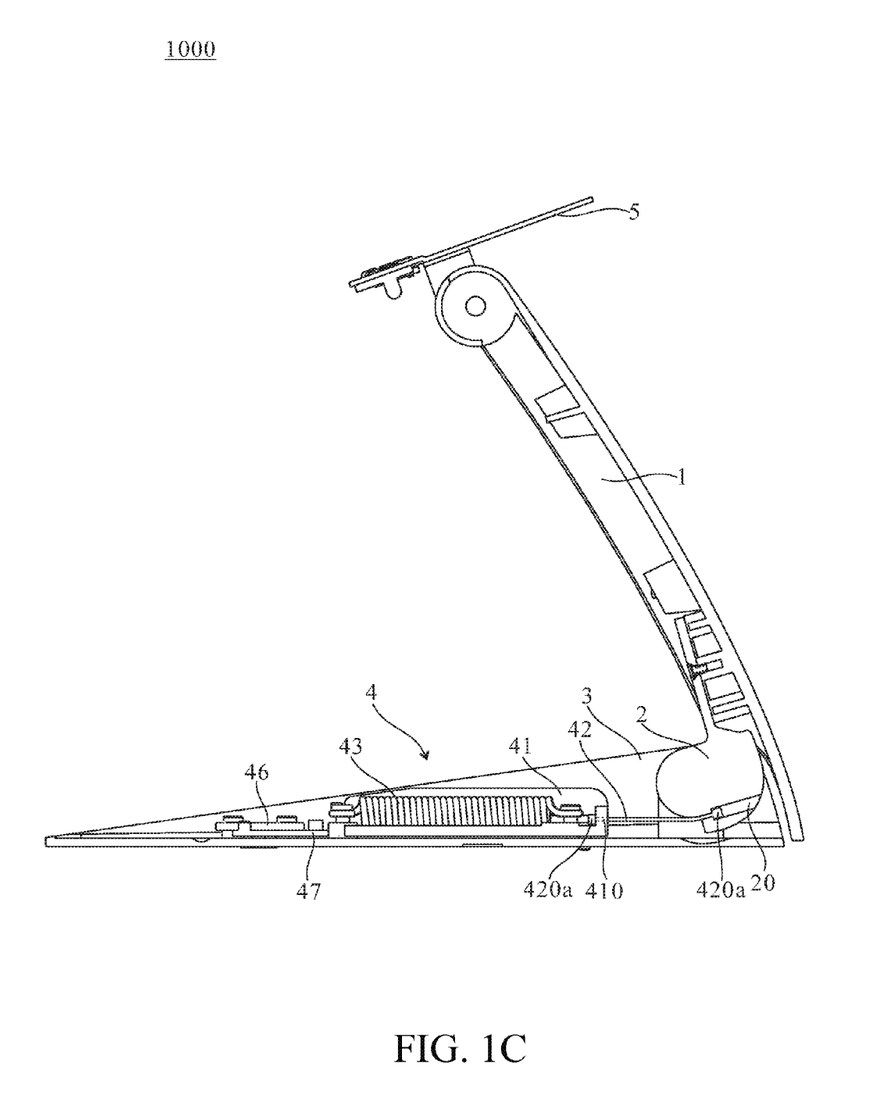
FIG. 1C is a schematic cross-sectional view taken along line A-A' in FIG. 1A.
Figure 1D:
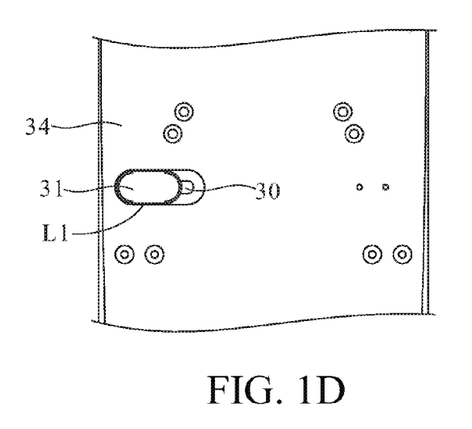
FIG. 1D is a partial schematic bottom view of the tensile switchable supporting frame according to the present invention.
Figure 2A:
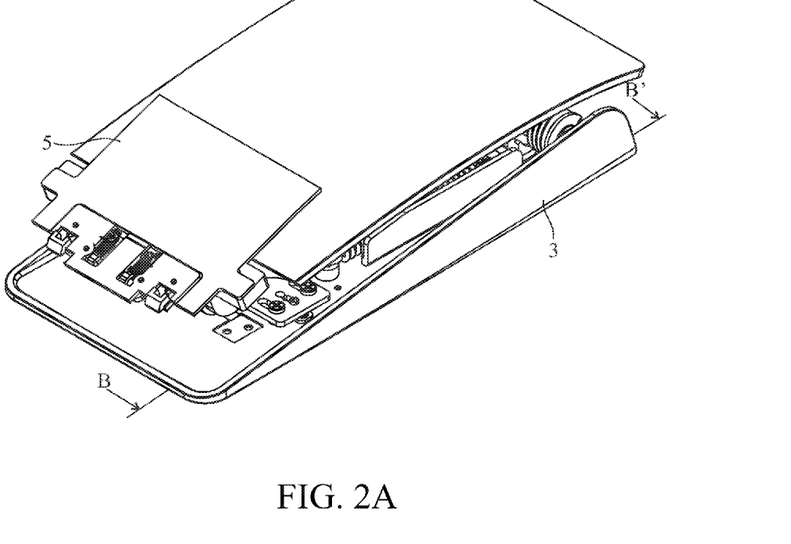
FIG. 2A is a schematic perspective view of the tensile switchable supporting frame in a folded state according to the present invention.
Figure 2B:
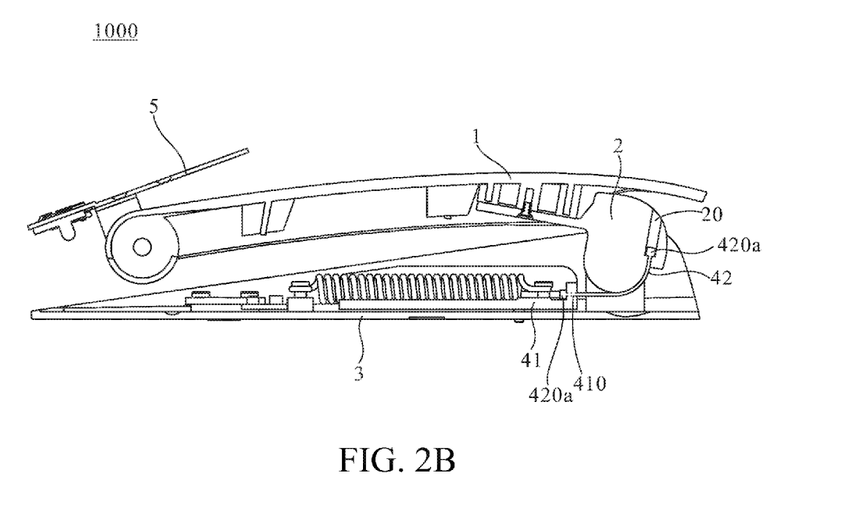
FIG. 2B is a schematic cross-sectional view taken along line B-B' in FIG. 2A.
Figure 2C:
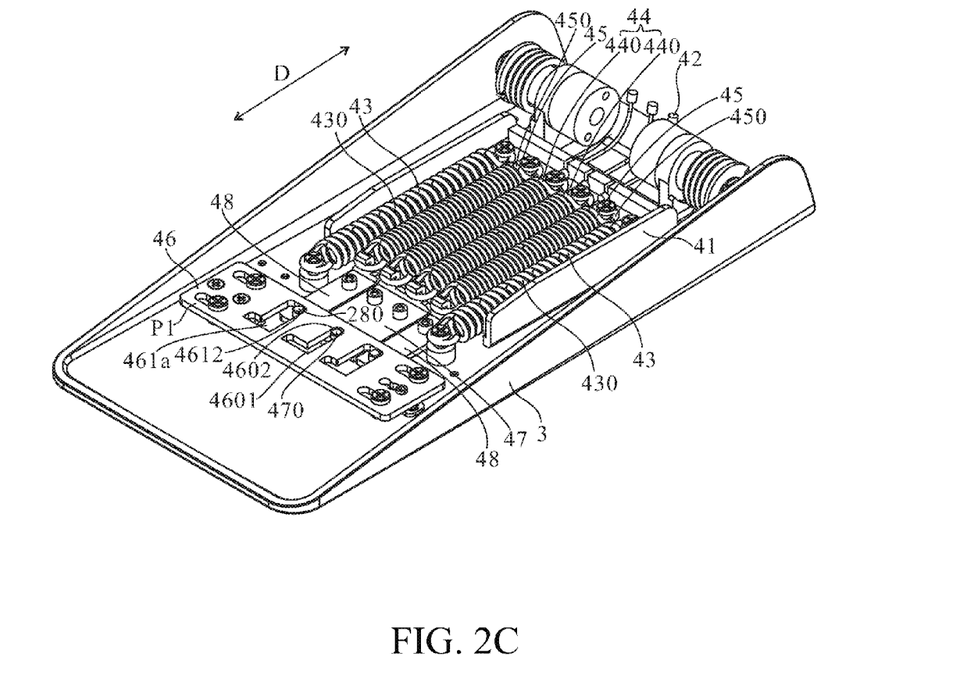
FIG. 2C is a partial schematic perspective view of the tensile switchable supporting frame in a folded state according to the present invention.

Please refer to FIG. 1A, FIG. 1B and FIG. 1D. The connection relation between the positioning plate 46 and the base 3 will be described hereinafter. The base 3 comprises a through hole 30, an adjusting knob 31, a positioning column 32, an upper surface 33 and a lower surface 34. The positioning plate 46 comprises a first positioning hole 462a, a second positioning hole 462b and a third positioning hole 462c that are intercommunicated with each other. The adjusting knob 31 is slidably disposed on a lower surface 34 of the base 3 by penetrating the through hole 30, with a sliding direction thereof being substantially perpendicular to the tensioning direction D. The adjusting knob 31 has two fixing columns 31a that extend to be fixed to the positioning plate 46. The positioning column 32 is fixedly disposed on an upper surface 33 of the base 3. It is noted that the adjusting knob 31 is disposed on the lower surface 34 of the base 3 and accommodated in the through hole 30 without protruding from the lower surface 34 of the base 3 so as to avoid leaning of the supporting frame 1000 when being placed. Furthermore, the user will switch the adjusting knob 31 on the lower surface 34 to keep the hands thereof away from the upper surface 33 of the base 3, thereby avoiding jamming of the hands due to an accidental folding of the frame body 1.

Please refer to FIG. 1A and FIG. 1B. When the adjusting knob 31 slides in the through hole 30, the positioning plate 46 is driven to slide so that the positioning column 32 can slide between the first positioning hole 462a, the second positioning hole 462b and the third positioning hole 462c.

More specifically, referring to FIG. 1A and FIG. 1B, the positioning column 32 is consisted of two elastic pieces 32a with a gap therebetween. The first positioning hole 462a, the second positioning hole 462b and the third positioning hole 462c communicate with each other via a channel 462d respectively, and a width of the channel 462d is smaller than a diameter of each of the positioning holes. Therefore, when the adjusting knob 31 is slid to move the positioning column 32 to the channel 462d, the elastic pieces 32a can be compressed, due to the gap therebetween, and become close to each other, so as to pass through the channel 462d. And when the positioning column 32 moves to each of the positioning holes 462a, 462b and 462c, the elastic pieces 32a restores to the original shape to keep the gap therebetween so that the positioning column 32 can stay at each of the positioning holes.

Finally, please refer to FIG. 1A and FIG. 1B. The frame body 1 is further connected with a connecting base 5, and the connecting base 5 may be used to be connected with a display module (not shown in the figures).

In this embodiment, the tensile switchable supporting frame 1000 allows for a three-stage adjustment. Operational relations among individual elements when the supporting frame 1000 is adjusted to a first stage, a second stage and a third stage will be described hereinafter.

Firstly, when the supporting frame 1000 is adjusted to the first stage and the adjusting knob 31 slides to a first location L1 (see FIG. 1D), the positioning column 32 is engaged into the first positioning hole 462a so that the positioning plate 46 is positioned at a first position P1, as shown in FIG. 1A. In this case, the first column 470 is positioned in the first sliding region 460a, and the first column 470 is located at a first end 4601 of the first sliding region 460a, as shown in FIG. 1C. At this point, the connecting base 5 has the furthest distance from the base 3 (i.e., the display module is located at the highest position). When the user needs to adjust the height of the display module by moving the connecting base 5 downwards towards the base 3, the frame body 1 and the pivoting shaft 2 are driven to pivot to get close to the base 3 at the same time.

According to the above descriptions and as shown in FIG. 2C, when the frame body 1 is folded towards the base 3, the connecting string 42 is winded by the pivoting shaft 2 to pull the accommodating base 41 so to tension the first elastic module 43. Meanwhile, the first connecting element 47 is driven by the accommodating base 41 via the second elastic module 44 to slide the first column 470 from the first end 4601 towards a second end 4602 of the first sliding region 460a.

That is, because the first sliding region 460a extends in a direction parallel to a tensioning direction D of the second tension spring 440, the first column 470 can slide in the first sliding region 460a; and in a case that one end of the second tension spring 440 is not fixed, each of the second tension springs 440 is not tensioned and only the first tension spring 430 of the first elastic module 43 is tensioned. In other words, only the first tension spring 430 provides a tensile force to achieve a supporting effect during the folding process.

Figure 3A:
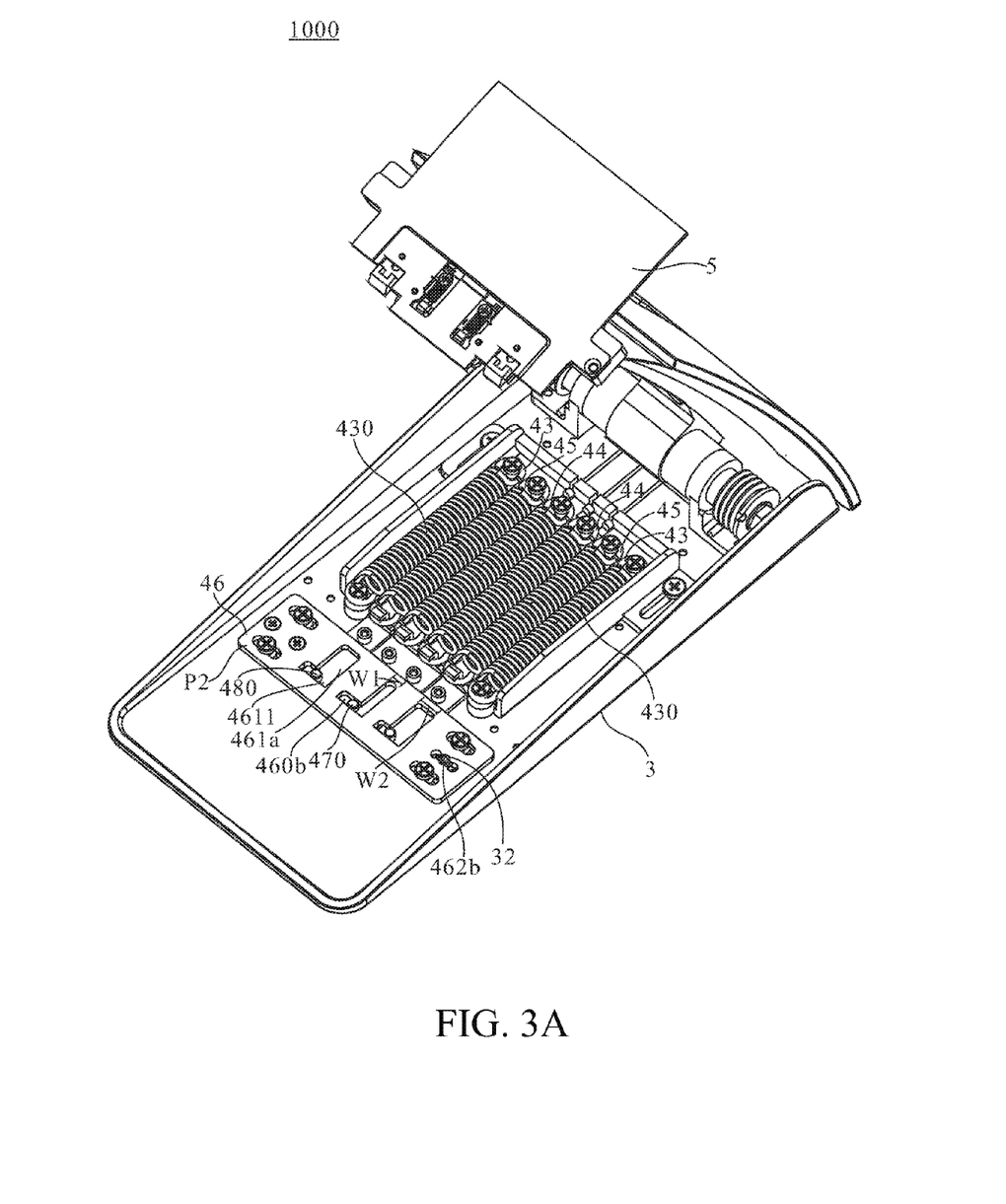
FIG. 3A is another schematic perspective view of the tensile switchable supporting frame according to the present invention.
Figure 3B:
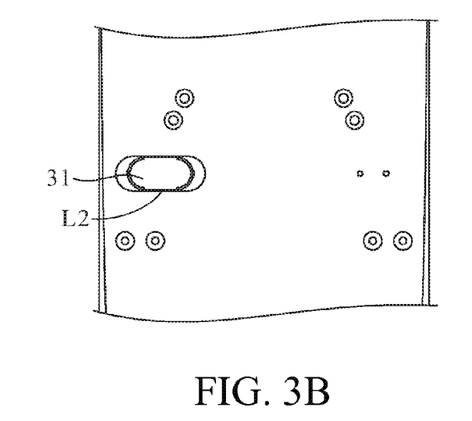
FIG. 3B is another partial bottom view of the tensile switchable supporting frame according to the present invention.

Referring to FIG. 3A and FIG. 3B, when the supporting frame 1000 is adjusted to the second stage and the adjusting knob 31 slides to a second location L2, the positioning plate 46 is slid with respect to the base 3 so that the positioning column 32 engages into the second positioning hole 462b. The positioning plate 46 is positioned at a second position P2, and the first column 470 is positioned in the first limiting region 460b.

Figure 3C:
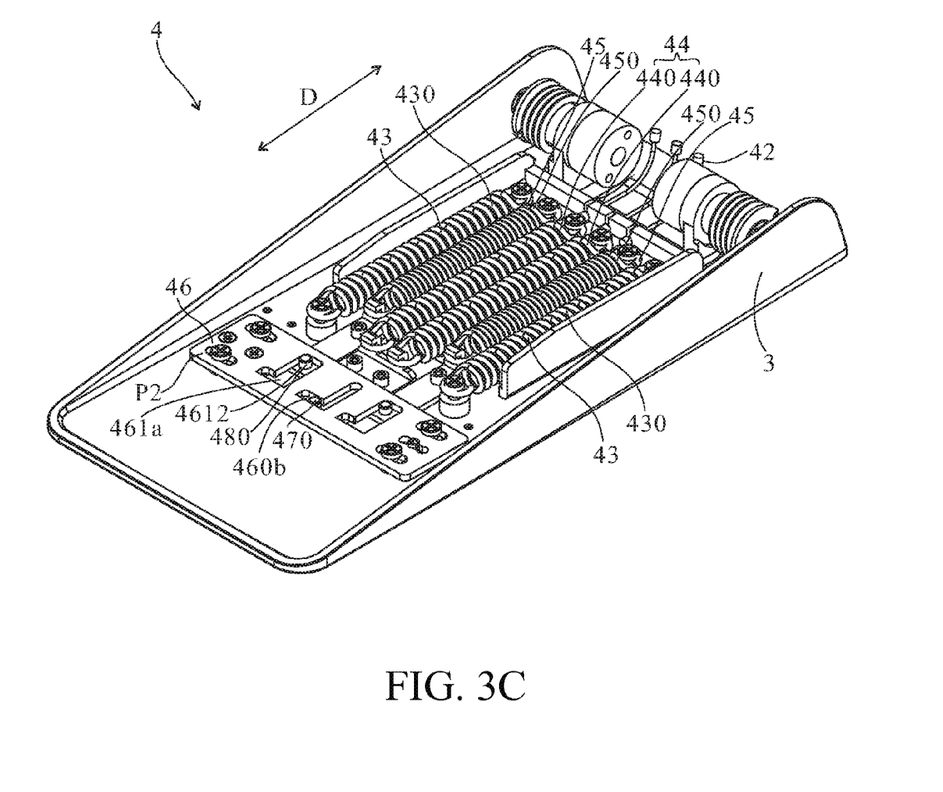
FIG. 3C is another partial schematic perspective view of the tensile switchable supporting frame in a folded state according to the present invention.

Referring to FIG. 3C, when the frame body 1 is folded towards the base 3, the connecting string 42 is winded by the pivoting shaft 2 to pull the accommodating base 41. Because the first limiting region 460b is perpendicular to the tensioning direction D, the first column 470 positioned in the first limiting region 460b is limited from sliding. Thus, each of the second tension springs 440 is capable of being tensioned. Therefore, in the folding process, the first tension springs 430 and the second tension springs 440 are tensioned at the same time, and as a result, a heavier display module can be supported now.

It should be particularly noted that, in the aforesaid first stage or second stage (i.e., when the adjusting knob 31 is positioned at one of the first location L1 or the second location L2), none of the third tension springs 450 of the third elastic module 45 will be tensioned during the folding process. This is because that a second width W2 of the second sliding region 461a is greater than a first width W1 of the first sliding region 460a (see FIG. 1B). So, even if the positioning plate 46 is adjusted from the first position P1 to the second position P2 (i.e., moves towards the top left corner in FIG. 1B), the second column 480 will still stay in the second sliding region 461a. Therefore, the third tension spring 450 will not be tensioned.

Figure 4A:
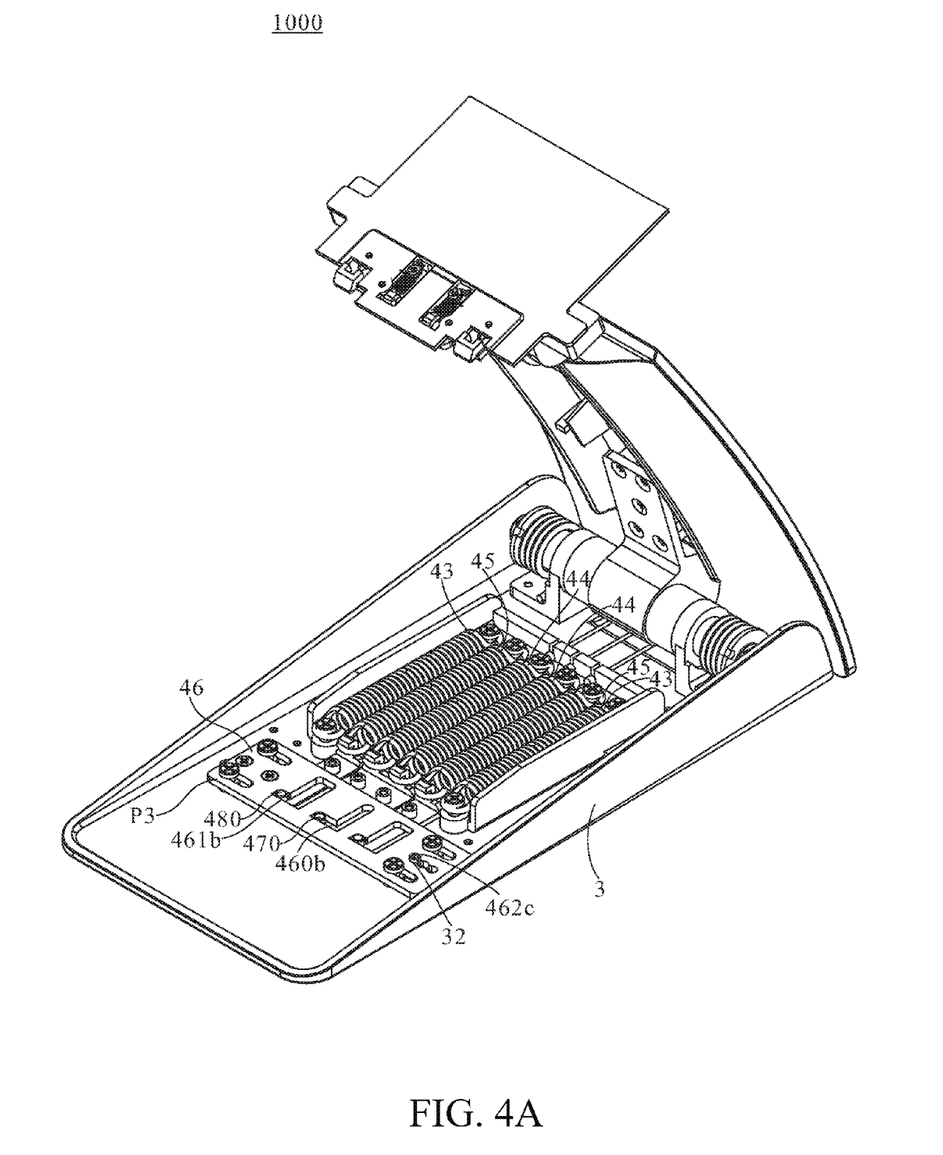
FIG. 4A is another schematic perspective view of the tensile switchable supporting frame according to the present invention.
Figure 4B:
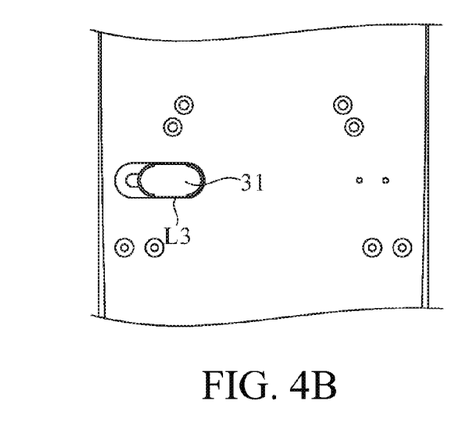
FIG. 4B is another partial bottom view of the tensile switchable supporting frame according to the present invention.

Referring to FIG. 4B, when the supporting frame 1000 is adjusted to the third stage (i.e., when the adjusting knob 31 slides to a third location L3), the positioning plate 46 is driven to slide with respect to the base 3 so that the positioning column 32 engages into the third positioning hole 462c and the positioning plate 46 is positioned at the third position P3, as shown in FIG. 4A. In this case, the second column 480 moves into the second limiting region 461b.

Figure 4C:
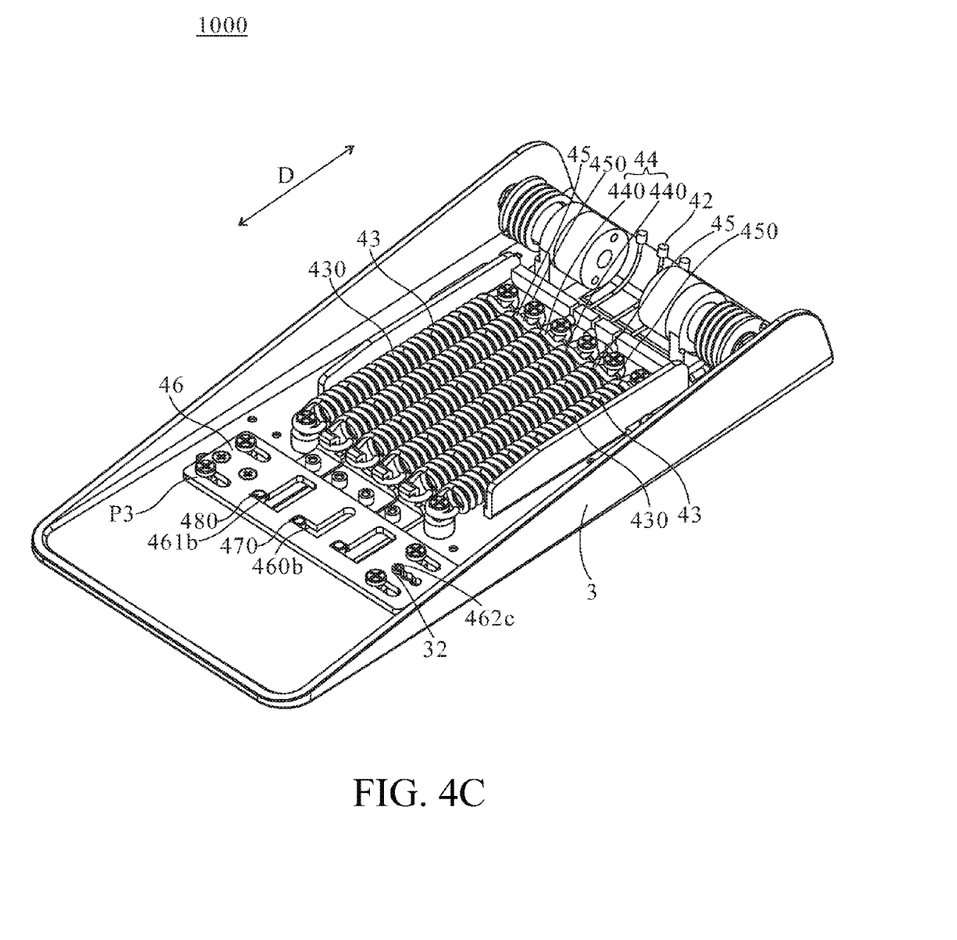
FIG. 4C is another partial schematic perspective view of the tensile switchable supporting frame in a folded state according to the present invention.

Referring to FIG. 4C, when the frame body 1 is folded towards the base 3, the connecting string 42 is winded by the pivoting shaft 2 to pull the accommodating base 41. Because the first limiting region 460b and the second limiting region 461b are both perpendicular to the tensioning direction D, the first column 470 and the second column 480 are limited from sliding. Therefore, the first tension spring 430, the second tension spring 440 and the third tension spring 450 are tensioned at the same time.

Accordingly, by positioning the positioning plate 26 at the first position P1, the second position P2 or the third position P3, the supporting frame 1000 of this embodiment can be adjusted to the first stage, the second stage or the third stage to support display modules of different weights respectively, e.g., a 20-inch display module of 7 kg, a 21-inch display module of 9.5 kg and a 23-inch display module of 12 kg. However, this is not intended to limit the tensile forces of the first elastic module 43, the second elastic module 44 and the third elastic module 45, and the numbers of the first tension springs 430, the second tension springs 440 and the third tension springs 450 and the tensile strengths thereof can be adjusted as needed.

Referring to FIG. 1A and FIG. 1B, in order to increase the loading force of the supporting frame 1000, the tensile switchable supporting frame 1000 of this embodiment further comprises a torsional spring assembly 6 disposed on the base 3 and joined to the pivoting shaft 2. The torsional spring assembly 6 comprises two torsional spring units 61 connectively sleeve on two sides of the pivoting shaft 2 respectively, to support the weight of display module together. However, in other embodiments of the present invention, the torsional spring assembly 6 may be omitted as needed.

According to the above descriptions, by sliding the adjusting knob, the positioning plate can slide to different positions and the number of the elastic modules that are tensioned can be adjusted in multiple stages so that the user can correspondingly adjust the loading force of the supporting frame according to the weight of the purchased display module. Furthermore, even if the user replaces the original display module with display modules of different weights, it is only necessary to make a corresponding adjustment by means of the adjusting knob without having to buy a suitable new supporting frame. Additionally, the supporting frame of the present invention can provide the user with a better operational experience.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A tensile switchable supporting frame, comprising:
a frame body;
a pivoting shaft;
a base being pivoted to the frame body via the pivoting shaft; and
an adjustable tensile structure, comprising:
an accommodating base being slidably disposed on the base;
a connecting string having two ends engaging with the pivoting shaft and the accommodating base respectively, wherein when the frame body pivots with respect to the base, the pivoting shaft pivots along with the frame body to drive the connecting string so as to drive the accommodating base;
a first elastic module being disposed in the accommodating base and having two ends which connect with the accommodating base and the base respectively;
a second elastic module being disposed in the accommodating base;
a positioning plate having a first groove, wherein the first groove has a first sliding region and a first limiting region that communicate with each other and extend in different directions; and
a first connecting element wherein two ends of the second elastic module are connected with the first connecting element and the accommodating base respectively, the first connecting element further having a first column which penetrates through the first groove and selectively moves between the first sliding region and the first limiting region;

wherein when the positioning plate is located at a first position, the first column is located in the first sliding region, and when the frame body is folded towards the base, the connecting string is winded by the pivoting shaft to pull the accommodating base so that the first elastic module is tensioned; and when the positioning plate is located at a second position, the first column is located in the first limiting region, and when the frame body is folded towards the base, the connecting string is winded by the pivoting shaft to pull the accommodating base so that both the first elastic module and the second elastic module are tensioned.

2. The tensile switchable supporting frame as claimed in claim 1, further comprising:
a third elastic module being disposed in the accommodating base; and
a second connecting element having a second column, wherein two ends of the third elastic module are connected with the accommodating base and the second connecting element respectively;
wherein the positioning plate further comprises a second groove having a second sliding region and a second limiting region that communicate with each other and extend in different directions, the second column of the second connecting element penetrating through the second groove and selectively moving between the second sliding region and the second limiting region; when the positioning plate is located at a third position, the first column being located in the first limiting region and the second column being located in the second limiting region, and when the frame body is folded towards the base, the connecting string is winded by the pivoting shaft to pull the accommodating base so that the first elastic module, the second elastic module and the third elastic module are tensioned simultaneously.

3. The tensile switchable supporting frame as claimed in claim 2, wherein when the positioning plate is located at the first position, the first column is located in the first sliding region, and when the frame body is folded towards the base, the first connecting element is driven by the accommodating base via the second elastic module to move the first column from a first end of the first sliding region towards a second end of the first sliding region so as to keep the second elastic module being untensioned.

4. The tensile switchable supporting frame as claimed in claim 3, wherein when the positioning plate is located at the first position or the second position, the second column is located in the second sliding region, and when the frame body is folded towards the base, the second connecting element is driven by the accommodating base via the third elastic module to move the second column from a third end of the second sliding region towards a fourth end of the second sliding region so as to keep the third elastic module being untensioned.

5. The tensile switchable supporting frame as claimed in claim 4, wherein a width of the second sliding region is greater than a width of the first sliding region.

6. The tensile switchable supporting frame as claimed in claim 5, wherein the base comprises a through hole, an adjusting knob and a positioning column, the positioning plate comprising a first positioning hole, a second positioning hole and a third positioning hole, the adjusting knob being slidably disposed on a lower surface of the base by penetrating the through hole and having at least one fixing column extending to be fixed to the positioning plate, the positioning column being fixedly disposed on an upper surface of the base, wherein when the adjusting knob slides to a first location, the positioning plate is driven to slide with respect to the base to engage the positioning column into the first positioning hole so that the positioning plate is positioned at the first position, when the adjusting knob slides to a second location, the positioning plate is driven to slide with respect to the base to engage the positioning column into the second positioning hole so that the positioning plate is positioned at the second position, and when the adjusting knob slides to a third location, the positioning plate is driven to slide with respect to the base to engage the positioning column into the third positioning hole so that the positioning plate is positioned at the third position.

7. The tensile switchable supporting frame as claimed in claim 6, wherein the positioning column has two elastic pieces, and the first positioning hole, the second positioning hole and the third positioning hole are intercommunicated with each other so that the positioning column is capable of sliding between the first positioning hole, the second positioning hole and the third positioning hole.

8. The tensile switchable supporting frame as claimed in claim 2, wherein the first elastic module comprises at least one first tension spring, the second elastic module comprises at least one second tension spring, the third elastic module comprises at least one third tension spring, and the first sliding region and the second sliding region extend in a direction parallel to a tensioning direction of the second tension spring and the third tension spring.

9. The tensile switchable supporting frame as claimed in claim 2, wherein the first sliding region and the second sliding region intersect with the first limiting region and the second limiting region at an angle respectively.

10. The tensile switchable supporting frame as claimed in claim 1, wherein the pivoting shaft comprises at least one first engaging groove, the accommodating base comprises at least one second engaging groove, and each of the two ends of the connecting string are provided with a protrusion to correspondingly engage with the first engaging groove and the second engaging groove respectively.

11. The tensile switchable supporting frame as claimed in claim 1, further comprising a torsional spring assembly disposed on the base and joined to the pivoting shaft.

* * * * *